United States Patent
Sasabe

(10) Patent No.: US 7,565,649 B2
(45) Date of Patent: Jul. 21, 2009

(54) DATA REPRODUCTION DEVICE, VIDEO DISPLAY APPARATUS AND SOFTWARE UPDATE SYSTEM AND SOFTWARE UPDATE METHOD WHICH USE THEM

(75) Inventor: Toru Sasabe, Minoh (JP)

(73) Assignee: Panasonic Corporation, Osaka (JP)

( * ) Notice: Subject to any disclaimer, the term of this patent is extended or adjusted under 35 U.S.C. 154(b) by 551 days.

(21) Appl. No.: 10/550,405

(22) PCT Filed: Mar. 30, 2004

(86) PCT No.: PCT/JP2004/004556

§ 371 (c)(1),
(2), (4) Date: Sep. 23, 2005

(87) PCT Pub. No.: WO2004/091207

PCT Pub. Date: Oct. 21, 2004

(65) Prior Publication Data

US 2006/0215994 A1    Sep. 28, 2006

(30) Foreign Application Priority Data

Apr. 2, 2003   (JP)  ............................. 2003-099069

(51) Int. Cl.
*G06F 9/44*     (2006.01)
*G06F 9/445*    (2006.01)
(52) U.S. Cl. .................. 717/168; 717/174; 717/169; 717/170
(58) Field of Classification Search ............. 717/101, 717/103, 120, 121, 168–173, 174, 175, 176, 717/177

See application file for complete search history.

(56) References Cited

U.S. PATENT DOCUMENTS

| 6,061,747 | A  | * | 5/2000 | Ducaroir et al. ............... 710/21 |
| 6,199,204 | B1 | * | 3/2001 | Donohue .................... 717/178 |
| 6,331,876 | B1 |   | 12/2001 | Koster et al. |

(Continued)

FOREIGN PATENT DOCUMENTS

EP          0993183        4/2000

(Continued)

OTHER PUBLICATIONS

Kim, et al., "Automatic Remote Firmware Upgrade Algorithm through Internet for DOCSIS Cable Modems"; Hanyang University Department of Electronic and Communications Engineering, 2002, 4 pgs.*

(Continued)

*Primary Examiner*—Wei Y Zhen
*Assistant Examiner*—Ryan D Coyer
(74) *Attorney, Agent, or Firm*—Greenblum & Bernstein, P.L.C.

(57) ABSTRACT

An MPEG decoder IC in a DVD reproduction apparatus decodes update software read from a CD-ROM, and a transmission signal conversion IC transmits the decoded update software to a television receiver via data lines, utilizing InfoFrames in supplemental data. A microprocessor in the DVD reproduction apparatus indicates a software update to a microprocessor in the television receiver. Software for the microprocessor is stored in a memory of the television receiver. The microprocessor updates the software in the memory using the update software received by a reception signal conversion IC.

13 Claims, 7 Drawing Sheets

U.S. PATENT DOCUMENTS

| | | | |
|---|---|---|---|
| 6,473,822 B1 * | 10/2002 | Nakamatsu et al. | 710/300 |
| 6,490,722 B1 * | 12/2002 | Barton et al. | 717/174 |
| 6,525,775 B1 * | 2/2003 | Kahn et al. | 348/460 |
| 7,272,711 B2 * | 9/2007 | Suda et al. | 717/172 |
| 7,293,169 B1 * | 11/2007 | Righi et al. | 717/171 |
| 7,370,114 B1 * | 5/2008 | Philyaw et al. | 717/172 |
| 2002/0152473 A1 | 10/2002 | Unger | |
| 2003/0041335 A1 | 2/2003 | Patry et al. | |
| 2003/0135868 A1 | 7/2003 | DeGeorge | |
| 2005/0097540 A1 | 5/2005 | Matsumoto et al. | |
| 2005/0212973 A1 | 9/2005 | Yamate | |
| 2006/0029139 A1 * | 2/2006 | Teichner et al. | 375/240.28 |

FOREIGN PATENT DOCUMENTS

| | | |
|---|---|---|
| EP | 1282316 | 2/2003 |
| JP | 10-164446 | 6/1998 |
| JP | 2000-115650 A | 4/2000 |
| JP | 2002-74852 | 3/2002 |
| JP | 2003-009059 | 1/2003 |
| JP | 2003-250101 A | 9/2003 |
| JP | 2003-534676 A | 11/2003 |
| JP | 2004-524719 A | 8/2004 |

OTHER PUBLICATIONS

Seferidis, Vassilis, "Boxing Clever", IEE Review Nov. 2001, pp. 41-45.*
English Language Abstract of JP 2003-009059.
English Language Abstract of EP 1 282 316.
English language Abstract of JP 2000-115650 A.
English language Abstract of JP 2003-250101 A.

* cited by examiner

DATA REPRODUCTION DEVICE, VIDEO DISPLAY APPARATUS AND SOFTWARE UPDATE SYSTEM AND SOFTWARE UPDATE METHOD WHICH USE THEM

TECHNICAL FIELD

The present invention relates to a data reproduction apparatus, a video display apparatus, and a software updating system and a software updating method using the data reproduction apparatus and the video display apparatus.

BACKGROUND ART

When problems occur in software for a television receiver, it is necessary to update the software in order to correct the problems. For this reason, a software updating circuit is suggested for updating software for a television receiver. For example, a software updating circuit described in JP 10-164446 A is provided with a changeover switch that enables software to be changed in a market adjustment mode via a variety of input/output terminals in a television receiver.

FIG. 7 is a block diagram showing a conventional software updating circuit. The software updating circuit in FIG. 7 comprises a flash ROM (Read Only Memory) incorporating microprocessor 101, a switching circuit 103, and a signal processor 104.

Software 109 is written in the flash ROM in the microprocessor 101. The microprocessor 101 outputs a clock/data line switching signal 102 to the switching circuit 103. The switching circuit 103 feeds a clock/date signal 108 for updating the software to the microprocessor 101.

The television receiver has an S video input terminal 105. The S video input terminal 105 includes a luminance signal input terminal 106 and a chrominance signal input terminal 107. The S video input terminal 105 is connected with a board or a personal computer 110 for updating the software.

In the example of FIG. 7, when the television receiver enters a market adjustment mode, update software is input from the software updating board or the personal computer 110 by way of the luminance signal input terminal 106, the chrominance signal input terminal 107, and the switching circuit 103 to the microprocessor 101 as the clock/data signal 108.

In this manner, the software 109 for the microprocessor 101 is updated by the clock/data signal 108 from the software updating board or the personal computer 110.

With the conventional software updating circuit, however, a service man has to visit a house to set the television receiver in a market adjustment mode before connecting a special software updating board or the personal computer 110 to the S video input terminal 105 of the television receiver.

Further, even if such conditions for software updating are satisfied, the operation of software updating is so complicated that a user cannot update software on his or her own at home without a service man visiting his or her house.

DISCLOSURE OF INVENTION

It is an object of the invention to provide a data reproduction apparatus that allows a user to easily update software for a video display apparatus.

Another object of the invention is to provide a video display apparatus that allows the user to easily update software.

Still another object of the invention is to provide a software updating system and a software updating method that allow the user to easily update software for a video display apparatus.

A data reproduction apparatus according to one aspect of the invention, for reproducing data recorded in a recording medium, and capable of being connected via an interface bus to a video display apparatus that operates according to software, comprises a transmitter that transmits video data and audio data read from the recording medium, using a first area and a second area, respectively, to the video display apparatus via the interface bus, and a controller that controls the transmitter to transmit, at the time of a software update for the video display apparatus, update software read from the recording medium to the video display apparatus via the interface bus, using a third area for transmission of additional data that is different from the first and second areas, while indicating the software update to the video display apparatus.

The video data and the audio data read from the recording medium are transmitted, using the first area and the second area, respectively, from the transmitter in the data reproduction apparatus via the interface bus to the video display apparatus. This causes an image to be displayed on the video display apparatus based on the video data, and a sound to be output from the video display apparatus based on the audio data.

At the time of the software update for the video display apparatus, the controller controls the transmitter to transmit the update software read from the recording medium to the video display apparatus via the interface bus, using the third area for transmission of the additional data. In addition, the controller indicates the software update for the video display apparatus. The software for the video display apparatus is thus updated using the update software.

This allows the user to easily update the software for the video display apparatus using the data reproduction apparatus.

Information related to the software update may further be recorded in the recording medium, and the controller may control, at the time of the software update for the video display apparatus, the transmitter to transmit the related information read from the recording medium to the video display apparatus via the interface bus, using the first area and/or the second area.

In this case, at the time of the software update for the video display apparatus, the related information read from the recording medium is transmitted to the video display apparatus via the interface bus, using the first area and/or the second area. This allows the information related to the software update to be displayed or output on or from the video display apparatus.

The related information may include audio data, and the controller may control the transmitter, at the time of the software update for the video display apparatus, to transmit the audio data in the related information read from the recording medium to the video display apparatus via the interface bus, using the second area.

In this case, at the time of the software update for the video display apparatus, the audio data in the related information read from the recording medium is transmitted to the video display apparatus via the interface bus, using the second area. This allows the information related to the software update to be output from the video display apparatus as a sound.

The related information may include video data, and the controller may control the transmitter, at the time of the software update for the video display apparatus, to transmit the video data in the related information read from the recording medium to the video display apparatus via the interface bus, using the first area.

In this case, at the time of the software update for the video display apparatus, the video data in the related information read from the recording medium is transmitted to the video display apparatus via the interface bus, using the first area. This allows the information related to the software update to be displayed on the video display apparatus as an image.

The related information may include operational guide information representing an operational procedure for the software update.

In this case, at the time of the software update for the video display apparatus, the operational guide information representing the operational procedure for the software update is transmitted to the video display apparatus via the interface bus, using the first area and/or the second area. This allows the operational procedure for the software update to be displayed or output on or from the video display apparatus.

The interface bus may include a data line that transmits the video data, the audio data, and the additional data, a clock line that transmits a clock signal, and a control line that transmits a control signal, wherein the first area may be a video period of the video data, and the second and third areas may be present in a blanking interval of the video data, and the transmitter may output a clock signal to the clock line while transmitting, in synchronization with the clock signal, the update software via the data line using the third area.

In this case, the video data, audio data, and additional data read from the recording medium are transmitted to the video display apparatus via the data line, the clock signal is transmitted via the clock line, and the control signal is transmitted via the control line. The update software is transmitted in synchronization with the clock signal, using the third area for the additional data within a blanking interval of the video data. This allows the software for the video display apparatus to be updated using the interface bus that connects between the data reproduction apparatus and the video display apparatus.

The update software may include identification information for identifying an object whose software should be updated, and the controller may indicate a software update to the video display apparatus based on the identification information.

This provides an indication of the object whose software should be updated in the video display apparatus based on the identification information.

The data reproduction apparatus may further comprise a storage device that stores software for the controller, wherein the controller may indicate a software update to the video display apparatus when the identification information represents the video display apparatus, and may update the software stored in the storage device, using the update software read from the recording medium, when the identification information represents a software update for the controller.

In this case, when the identification information represents the video display apparatus, the controller indicates the software update to the video display apparatus. When the identification information represents the software update for the controller, the controller updates the software stored in the storage device, using the update software read from the recording medium. This allows the software for the video display apparatus and the software for the controller in the data reproduction apparatus to be selectively updated.

A video display apparatus according to another aspect of the invention comprises a video display apparatus that operates according to software, and a data reproduction apparatus for reproducing data recorded in a recording medium, and capable of being connected to the video display apparatus via an interface bus, wherein the data reproduction apparatus includes a transmitter that transmits video data and audio data read from the recording medium, using a first area and a second area, respectively, to the video display apparatus via the interface bus, and a controller that controls the transmitter to transmit, at the time of a software update for the video display apparatus, update software read from the recording medium to the video display apparatus via the interface bus, using a third area for transmission of additional data that is different from the first and second areas, while indicating the software update to the video display apparatus, and wherein the video display apparatus comprises a receiver that receives the video data and the audio data transmitted by the data reproduction apparatus via the interface bus using the first area and the second area, respectively, an audio output unit that outputs a sound based on the audio data received by the receiver, a video display unit that displays an image based on the video data received by the receiver, a processor that controls the video display unit and the audio output unit, and a storage that stores software for the processor, wherein the processor updates, upon reception of the update software by the receiver that is transmitted via the interface bus using the third area for transmission of the additional data that is different from the first and second areas, and indication of the software update by the data reproduction apparatus, the software stored in the storage using the update software received by the receiver.

The video data and the audio data transmitted by the data reproduction apparatus, using the first area and the second area, respectively, are received by the receiver in the video display apparatus via the interface bus. The sound is output from the audio output unit based on the audio data received by the receiver, and the image is displayed on the video display unit based on the video data received by the receiver.

Moreover, when the update software has been received by the receiver via the interface bus using the third area for transmission of the additional data, and the software update has been indicated by the data reproduction apparatus, the software stored in the storage device is updated using the received update software. In this way, the software for the video display apparatus can be easily updated using the data reproduction apparatus.

The processor may control the receiver to receive information related to the software update that is transmitted via the interface bus using the first area and/or the second area, and cause the video display unit to display an image and the audio output unit to output a sound, based on the related information received by the receiver.

In this case, the information related to the software update that is transmitted via the interface bus using the first area and/or the second area is received by the receiver. The image is displayed by the video display unit while the sound is output by the audio output unit, based on the received related information. This allows the user to easily recognize the information related to the software update visually and audibly.

The video display apparatus may further comprise an expansion function unit that implements an expansion function, another processor that controls the expansion function unit, and another storage that stores software for the processor for the expansion function, wherein the processor may transmit, upon indication of a software update for the other processor by the data reproduction apparatus, the update software received by the receiver to the other processor while indicating the software update for the other processor, and the other processor may update the software stored in the other storage according to the indication by the processor, using the update software transmitted from the processor.

In this case, when the software update for the other processor in the video display apparatus has been indicated by the data reproduction apparatus, the received update software is transmitted to the other processor, and the software update is indicated to the other processor. This causes the other processor to update the software stored in the other storage using the update software. In this way, the software for the plurality of processors in the video display apparatus can be easily updated using the data reproduction apparatus.

The video display apparatus may include a television receiver. In this case, the software for the television receiver can be easily updated by the data reproduction apparatus.

A software updating system according to still another aspect of the invention comprises a video display apparatus that operates according to software, and a data reproduction apparatus for reproducing data recorded in a recording medium, and capable of being connected to the video display apparatus via an interface bus, wherein the data reproduction apparatus includes a transmitter that transmits video data and audio data read from the recording medium, using a first area and a second area, respectively, to the video display apparatus via the interface bus, and a controller that controls the transmitter to transmit, at the time of a software update for the video display apparatus, update software read from the recording medium to the video display apparatus via the interface bus, using the third area for transmission of the additional data that is different from the first and second areas, while indicating the software update to the video display apparatus, and wherein the video display apparatus comprises a receiver that receives the video data and the audio data transmitted by the data reproduction apparatus via the interface bus, using the first area and the second area, respectively, an audio output unit that outputs a sound based on the audio data received by the receiver, a video display unit that displays an image based on the video data received by the receiver, a processor that controls the video display unit and the audio output unit, and a storage that stores software for the processor, wherein the processor updates, upon reception of the update software by the receiver that is transmitted via the interface bus using the third area for transmission of the additional data, and indication of the software update by the data reproduction apparatus, the software stored in the storage using the update software received by the receiver.

The video data and the audio data read from the recording medium are transmitted by the transmitter in the data reproduction apparatus, using the first area and the second area, respectively, to the video display apparatus via the interface bus. The video data and the audio data transmitted by the data reproduction apparatus, using the first area and the second area, respectively, are thus received by the receiver in the video display apparatus via the interface bus. The sound is output from the audio output unit based on the audio data received by the receiver, and the image is displayed on the video display unit based on the video data received by the receiver.

At the time of the software update for the video display apparatus, the controller controls the transmitter to transmit the update software read from the recording medium to the video display apparatus via the interface bus, using the third area for transmission of the additional data. In addition, the controller indicates the software update to the video display apparatus. The software stored in the storage device in the video display apparatus is thus updated using the received update software.

In this way, the software for the video display apparatus can be easily updated using the data reproduction apparatus.

A software updating method according to yet another aspect of the invention, for updating software for a video display apparatus using a data reproduction apparatus for reproducing data recorded in a recording medium, and capable of being connected to the video display apparatus via an interface bus, comprises the steps of transmitting, at the time of a software update for the video display apparatus, update software read by the data reproduction apparatus from the recording medium to the video display apparatus via the interface bus, using a third area for transmission of additional data other than a first area for transmission of video data and a second area for transmission of audio data; indicating the software update to the video display apparatus by the data reproduction apparatus; receiving by the video display apparatus, upon indication of the software update by the data reproduction apparatus to the video display apparatus, the update software transmitted via the interface bus using the third area; and updating the software for the video display apparatus using the received update software.

In the software updating method, at the time of the software update for the video display apparatus, the update software read by the data reproduction apparatus from the recording medium is transmitted to the video display apparatus via the interface bus, using the third area other than the first area for transmission of the video data and the second area for transmission of the audio data. When the software update has been indicated by the data reproduction apparatus to the video display apparatus, the update software transmitted via the interface bus using the third area is received by the video display apparatus. The software for the video display apparatus is updated using the received update software.

In this way, the software for the video display apparatus can be easily updated using the data reproduction apparatus.

BEST MODE FOR CARRYING OUT THE INVENTION

Figure 1:
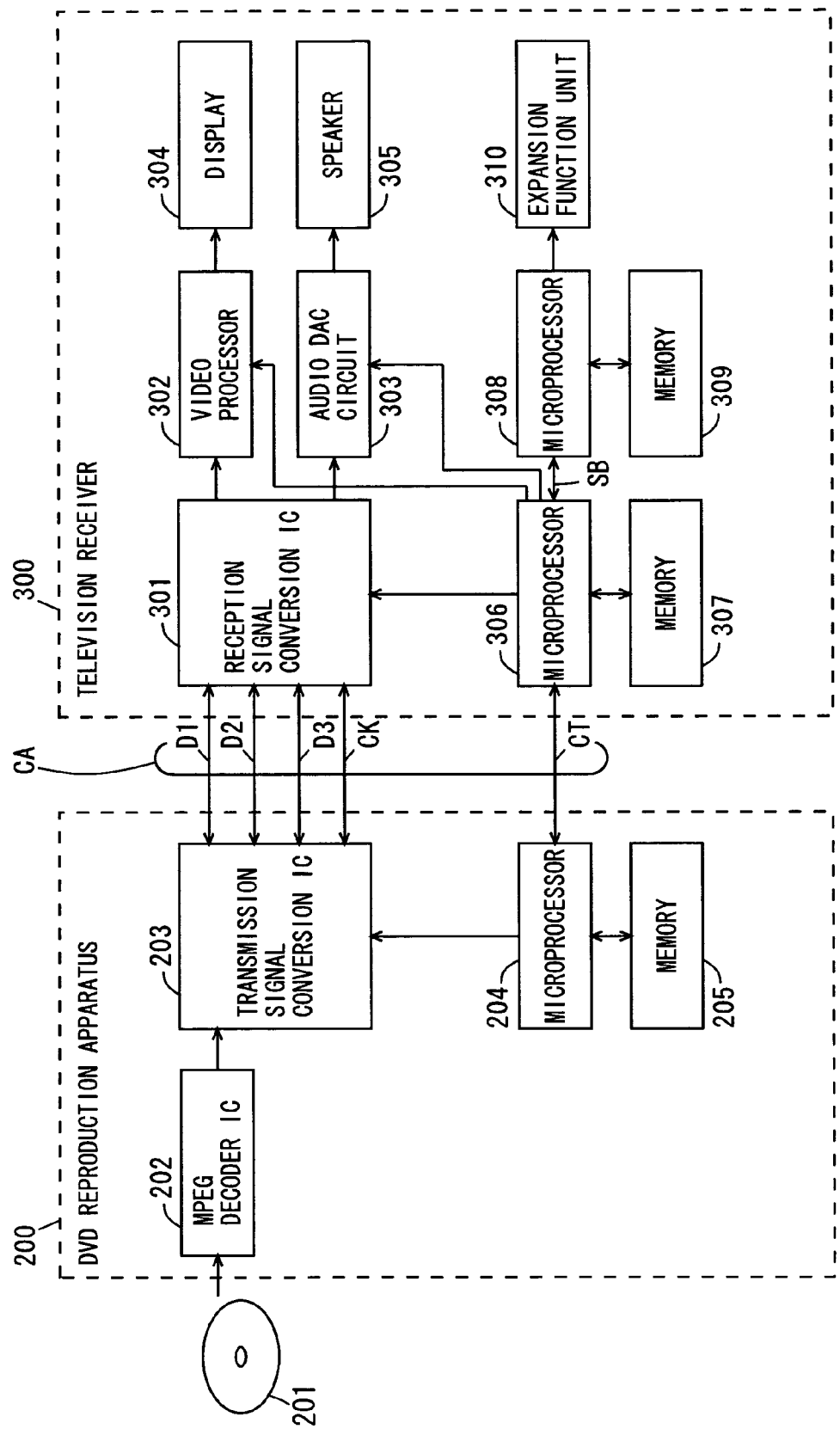
FIG. 1 is a block diagram showing the configuration of a software updating system according to an embodiment of the invention.

FIG. 1 is a block diagram showing the configuration of a software updating system according to an embodiment of the present invention.

As shown in FIG. 1, the software updating system comprises a DVD (Digital Versatile Disk) reproduction apparatus 200 and a television receiver 300. The television receiver 300 is connected with the DVD reproduction apparatus 200. A CD-ROM (Compact-Disk Random-Access Memory) 201 has recorded therein update software and operational guide information in MPEG (Moving Picture Coding Experts Group) form.

The update software herein includes software for correcting problems in an earlier version of software, software for reinforcing or adding functions, a later version of software, and the like. The operational guide information is information for guiding visually and audibly a user through the operational procedure to be performed for a software update. The operation to be performed by the user includes, for example, selection of software to be updated, selection of a function to be updated, ejection of the CD-ROM 201, and the like.

The DVD reproduction apparatus 200 includes an MPEG decoder IC (Integrated Circuit) 202, a transmission signal conversion IC 203, a microprocessor 204, and a memory 205.

The television receiver 300 includes a reception signal conversion IC 301, a video processor 302, an audio DAC (Digital-Analog Converter) circuit 303, a display 304, a speaker 305, a microprocessor 306, a memory 307, a microprocessor 308, a memory 309, and an expansion function unit 310.

The DVD reproduction apparatus 200 and the television receiver 300 are connected via an HDMI interface cable CA in conformity with the digital interface standard referred to as HDMI (High-Definition Multimedia Interface) standard. The HDMI interface cable CA includes data lines D1, D2, D3, a pixel clock line CK, and a control line CT.

According to the HDMI standard, it is possible to transmit video data while transmitting supplemental data during blanking intervals (vertical blanking intervals and horizontal blanking intervals) of the video data. The supplemental data includes audio data (audio packets) and data packets referred to as InfoFrames (Information Frames) Utilizing these InfoFrames, it is possible to transmit a variety of information (additional data). In the embodiment, the update software is transmitted by utilizing the InfoFrames. The aforementioned operational guide information comprises pixel components (video data) and audio data included in the InfoFrames.

The update software is divided into a plurality of data packets, and the plurality of data packets are distributed to be inserted into InfoFrames for a plurality of blanking intervals. The update software is rearranged based on the header added to each data packet for restoration.

The microprocessor 204 in the DVD reproduction apparatus 200 controls the transmission signal conversion IC 203.

At normal times, the MPEG decoder IC 202 decodes the data recorded in a DVD in MPEG form, and at the time of a software update, it decodes the data recorded in the CD-ROM 201 in MPEG form (i.e., update software). The transmission signal conversion IC 203 separates the data decoded by the MPEG decoder IC 202 into pixel component data (video data) and supplemental data, outputs a pixel clock to the pixel clock line CK, and outputs the pixel component data and the supplemental data to the data lines D1, D2, D3 in synchronization with the pixel clock.

The data line D1 transfers the pixel component B (blue video data) and the supplemental data to the television receiver 300 in synchronization with the pixel clock on the pixel clock line CK. The data line D2 transfers the pixel component G (green video data) and the supplemental data to the television receiver 300 in synchronization with the pixel clock on the pixel clock line CK. The data line D3 transfers the pixel component R (red video data) and the supplemental data to the television receiver 300 in synchronization with the pixel clock.

The reception signal conversion IC 301 in the television receiver 300 receives the pixel components and the supplemental data transferred via the data lines D1, D2, D3 in synchronization with the pixel clock on the pixel clock line CK. The video processor 302 extracts a video signal from the pixel components received by the reception signal conversion IC 301, and causes the display 304 to display an image based on the video signal. The audio DAC circuit 303 converts the audio data included in the supplemental data received by the reception signal conversion IC 301 to an analog audio signal, and causes the speaker 305 to output a sound based on the audio signal.

The microprocessor 306 controls the video processor 302 and the audio DAC circuit 303. The memory 307 stores software for the microprocessor 306. The microprocessor 308 controls the expansion function unit 310. The memory 309 stores software for the microprocessor 308. The expansion function unit 310 implements functions available in addition to the inherent functions of the television receiver 300, i.e., displaying images and outputting sounds. For example, the expansion function unit 310 includes such functions as recording of television broadcast and connection to the Internet.

Referring now to the flowcharts of FIG. 2 to FIG. 6, the operation of the software updating system in FIG. 1 is described.

Figure 2:
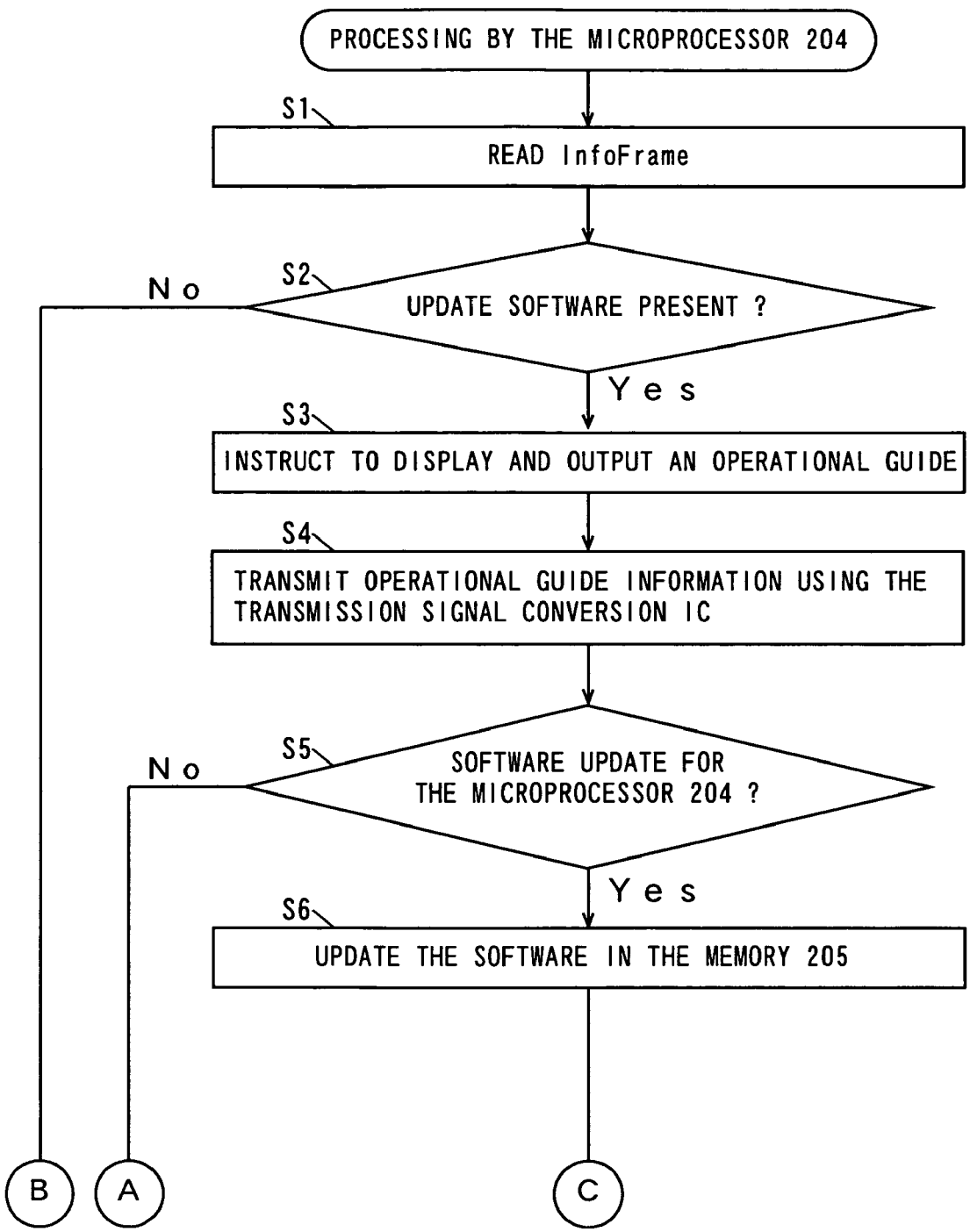
FIG. 2 is a flowchart showing processing by a microprocessor in the DVD reproduction apparatus in FIG. 1.
Figure 3:
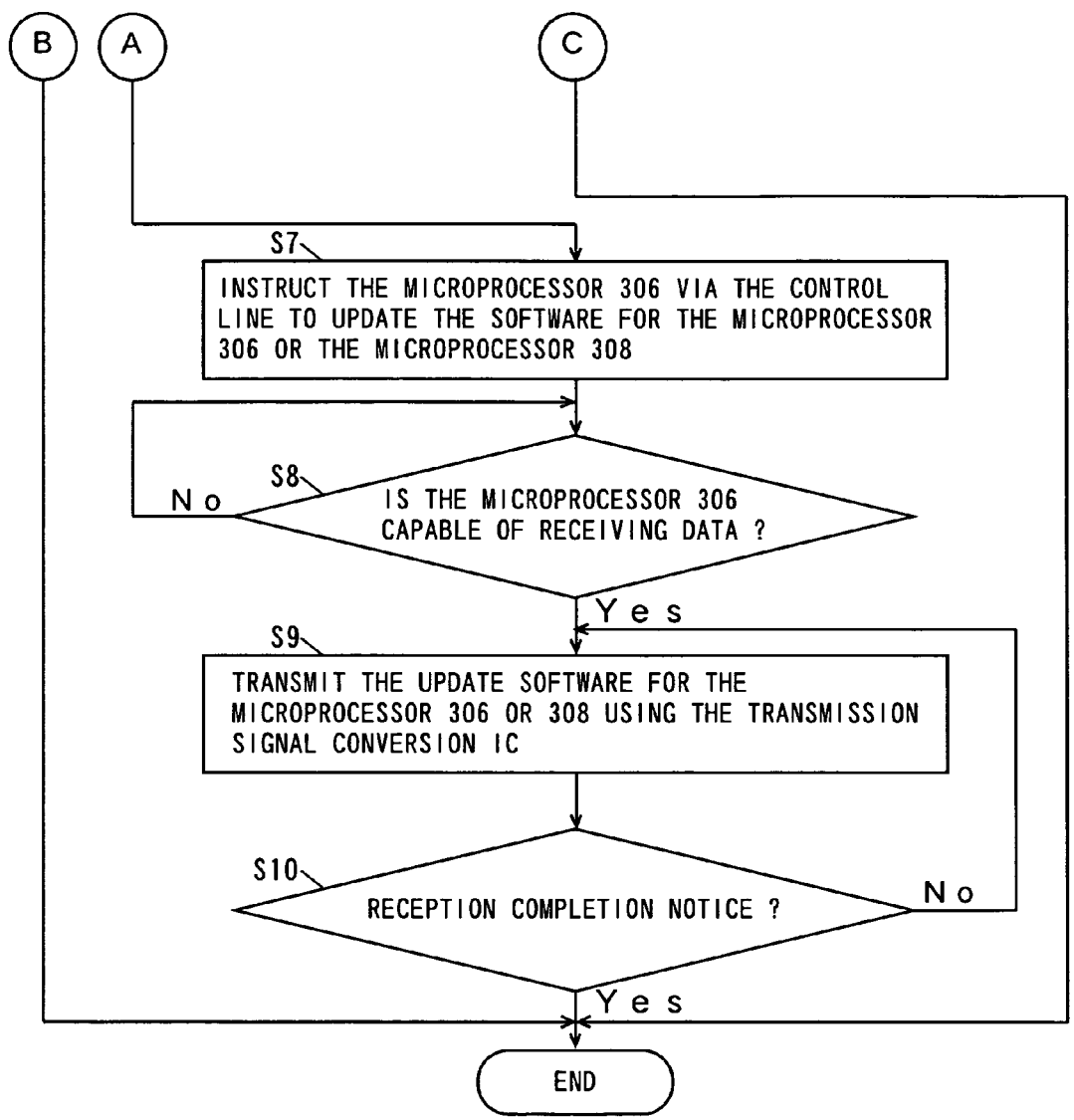
FIG. 3 is a flowchart showing the processing by the microprocessor in the DVD reproduction apparatus in FIG. 1.

FIG. 2 and FIG. 3 are flowcharts each showing processing by the microprocessor 204 in the DVD reproduction apparatus 200 in FIG. 1.

The CD-ROM 201 has recorded therein the update software and the operational guide information in MPEG form. The update software includes ID (identification) information representing for which of the microprocessors 204, 306, 308 the software should be updated.

When the user inserts the CD-ROM 201 into a CD-ROM drive (not shown) of the DVD reproduction apparatus 200, the MPEG decoder IC 202 decodes the data read from the CD-ROM 201, and feeds the decoded data to the transmission signal conversion IC 203. The transmission signal conversion IC 203 separates the decoded data into pixel components and supplemental data.

The microprocessor 204 first reads InfoFrames from the supplemental data obtained from the MPEG decoder IC 202 (Step 1). Then, the microprocessor 204 determines whether or not update software is included in the read InfoFrames (Step S2).

When the update software is included in the InfoFrames, the microprocessor 204 instructs the microprocessor 306 in the television receiver 300 via the control line CT to display and output a visual and audio operational guide (Step S3), and transmits operational guide information to the television receiver 300 as the pixel components and the supplemental data using the transmission signal conversion IC 203 (Step 4). This causes the display 304 in the television receiver 300 to display an image showing an operational procedure, and the speaker 305 to output a sound showing the operational procedure.

Further, the microprocessor 204 determines whether or not the ID information in the InfoFrames read from the transmission signal conversion IC 203 indicates a software update for the microprocessor 204 (Step S5).

When the ID information indicates a software update for the microprocessor 204, the microprocessor 204 rewrites the software stored in the memory 205 with the update software in the InfoFrames to update the software in the memory 205 (Step S6), to complete the processing.

When at Step S5, the ID information does not indicate a software update for the microprocessor 204, the microprocessor 204 instructs the microprocessor 306 in the television receiver 300 via the control line CT to update the software for the microprocessor 306 or the microprocessor 308 based on the ID information (Step S7).

After that, the microprocessor 204 determines whether or not the microprocessor 306 is capable of receiving data (Step S8). When the microprocessor 306 is capable of receiving data, the microprocessor 204 transmits the update software for the microprocessor 306 or 308 to the television receiver 300 via the data lines D1, D2, D3 using the transmission signal conversion IC 203 (Step S9).

Then, the microprocessor 204 determines whether or not a reception completion notice has been received from the microprocessor 306 in the television receiver 300 via the control line CT (Step S10). The microprocessor 204 continues the processing at Step S9 until it receives the reception completion notice from the microprocessor 306. Upon reception of the reception completion notice from the microprocessor 306, the microprocessor 204 completes the processing.

If, at Step S2, the update software is not included in the InfoFrames, the microprocessor 204 completes the processing.

Figure 4:
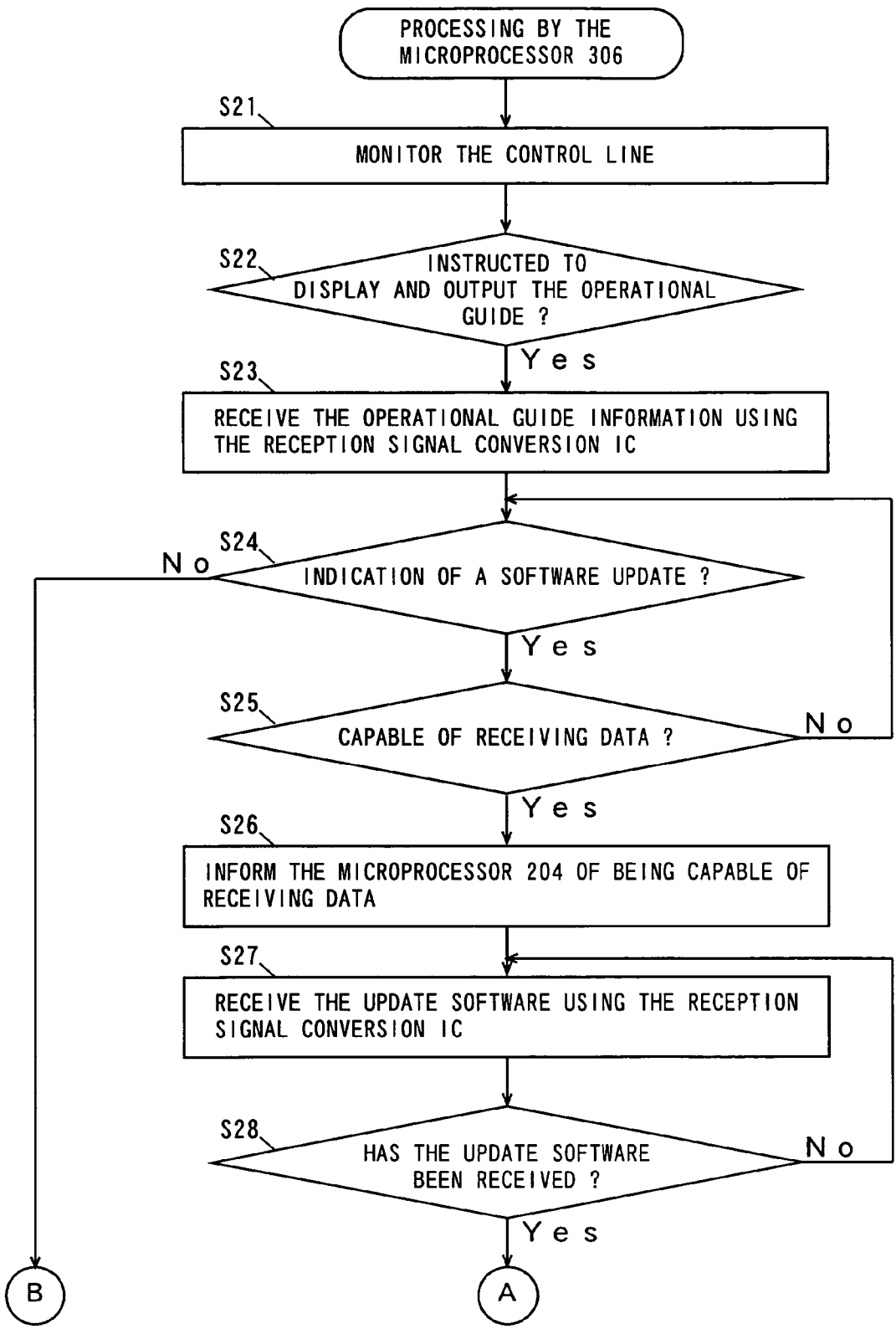
FIG. 4 is a flowchart showing processing by a microprocessor in the television receiver in FIG. 1.
Figure 5:
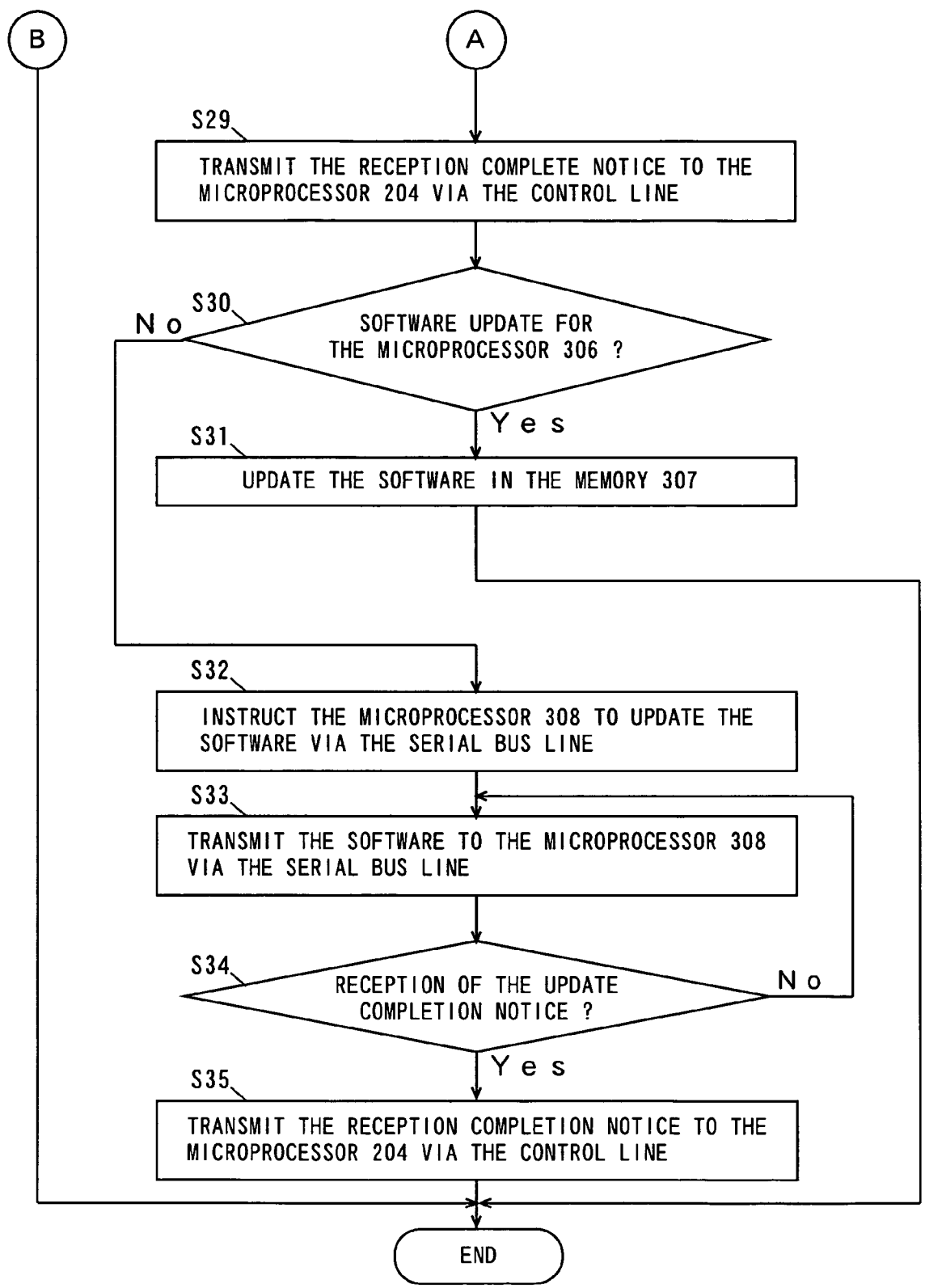
FIG. 5 is a flowchart showing the processing by the microprocessor in the television receiver in FIG. 1.

FIG. 4 and FIG. 5 are flowcharts each showing processing by the microprocessor 306 in the television receiver 300 in FIG. 1.

The microprocessor 306 in the television receiver 300 monitors the control line CT (Step S21) to determine whether or not it has been instructed via the control line CT to display and output the operational guide (Step S22). When instructed to display and output the operational guide, the microprocessor 306 receives the operational guide information via the data lines D1, D2, D3 using the reception signal conversion IC 301 (Step S23).

Then, the microprocessor 306 determines whether or not a software update has been indicated via the control line CT (Step S24).

Upon indication of a software update, the microprocessor 306 determines whether or not it is capable of receiving data (Step S25). When being capable of receiving data, the microprocessor 306 informs the microprocessor 204 in the DVD reproduction apparatus 200 via the control line CT that it is capable of receiving data (Step S26).

The microprocessor 306 subsequently receives the update software via the data lines D1, D2, D3 using the reception signal conversion IC 301 (Step S27). The microprocessor 306 determines whether or not the update software has been received from the DVD reproduction apparatus 200 (Step S28).

Upon reception of the update software, the microprocessor 306 transmits a reception completion notice to the microprocessor 204 in the DVD reproduction apparatus 200 via the control line CT (Step S29).

Then, the microprocessor 306 determines whether or not the ID information in the InfoFrames indicates a software update for the microprocessor 306 (Step S30).

When the ID information indicates a software update for the microprocessor 306, the microprocessor 306 rewrites the software stored in the memory 307 with the update software in the InfoFrames to update the software in the memory 307 (Step S31), to complete the processing.

When the ID information does not indicate a software update for the microprocessor 306, the microprocessor 306 instructs the microprocessor 308 to update the software via a serial bus line SB (Step S32). Further, the microprocessor 306 transmits the update software to the microprocessor 308 via the serial bus line SB (Step S33).

After that, the microprocessor 306 determines whether or not an update completion notice has been received from the microprocessor 308 via the serial bus line SB (Step S34). Upon reception of the update completion notice from the microprocessor 308, the microprocessor 306 transmits the reception completion notice to the microprocessor 204 in the DVD reproduction apparatus 200 via the control line CT (Step S35), to complete the processing.

Figure 6:
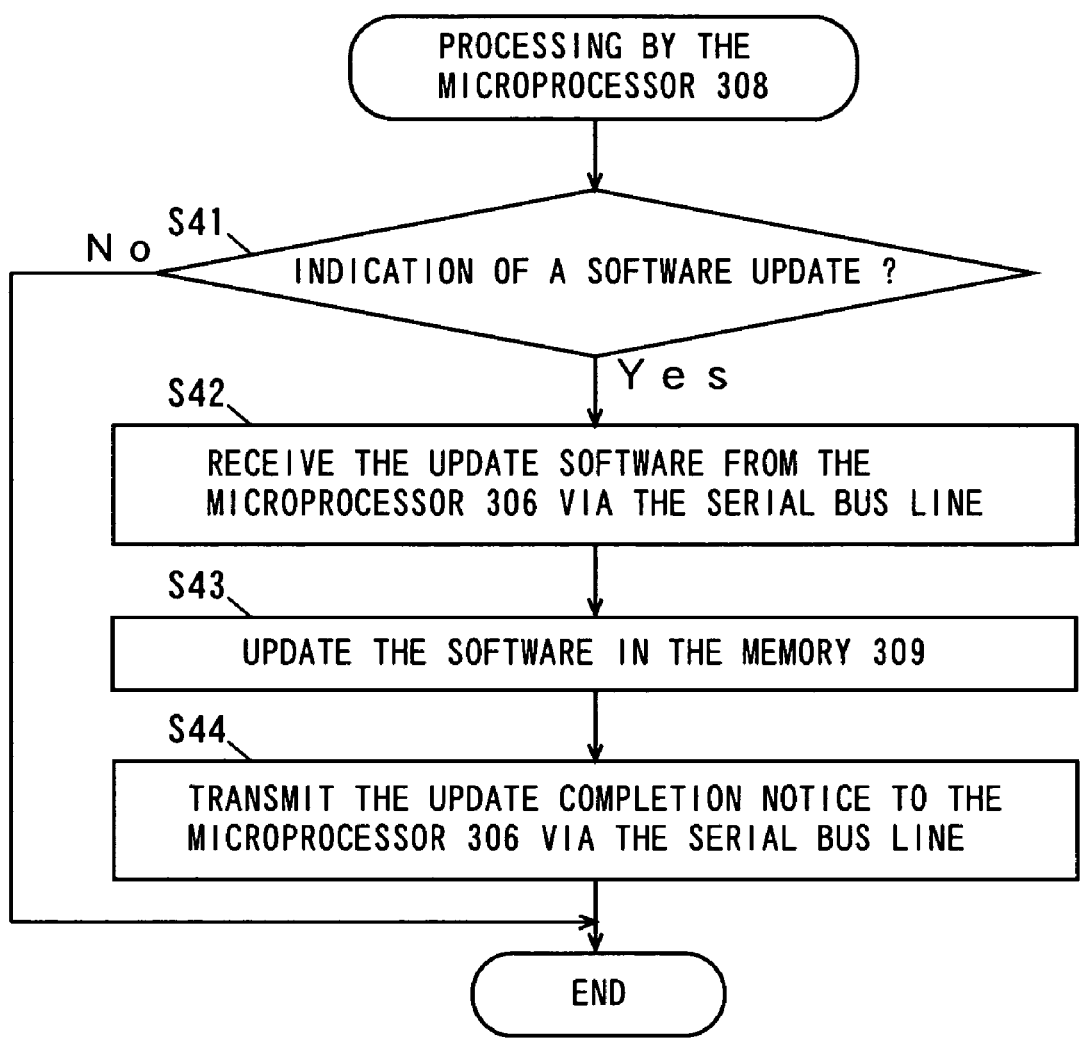
FIG. 6 is a flowchart showing processing by a microprocessor in the television receiver in FIG. 1.
Figure 7:
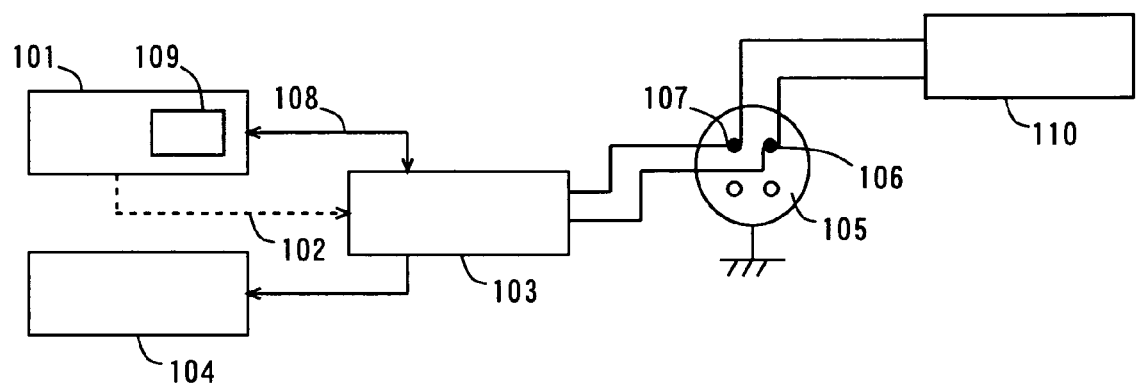
FIG. 7 is a block diagram showing the configuration of a conventional software updating circuit.

FIG. 6 is a flowchart showing processing by the microprocessor 308 in the television receiver 300 in FIG. 1.

The microprocessor 308 determines whether or not a software update has been indicated by the microprocessor 306 via the serial bus line SB (Step S41). Upon indication of a software update by the microprocessor 306, the microprocessor 308 receives the update software from the microprocessor 306 via the serial bus line SB (Step S42).

Then, the microprocessor 308 rewrites the software stored in the memory 309 with the update software received from the microprocessor 306 to update the software in the memory 309 (Step S43).

After that, the microprocessor 308 transmits an update completion notice to the microprocessor 306 via the serial bus line SB (Step S44).

In this way, the update software recorded in the CD-ROM 201 in MPEG form is downloaded onto the microprocessor 204 in the DVD reproduction apparatus 200 or onto the microprocessor 306 or 308 in the television receiver 300 based on the ID information, and the software stored in the memory 205, 307 or 309 is updated.

As described above, the software updating system according to the embodiment enables the software for any of the microprocessor 204 in the DVD reproduction apparatus 200 and the microprocessors 306, 308 in the television receiver 300 to be easily updated simply by inserting the CD-ROM 201 that has recorded therein the update software in MPEG form into the DVD reproduction apparatus 200 connected to the television receiver 300. This eliminates the necessity for a service man to visit each user's house to update software using a special technique. This results in substantial reductions in the service cost.

Moreover, in the software updating system according to the embodiment, connection of the DVD reproduction apparatus 200 to the television receiver 300 via the data lines D1, D2, D3, the pixel clock line CK, and the control line CT in conformity with the HDMI standard enables transfer of the operational guide information comprising video data and audio data from the DVD reproduction apparatus 200 to the television receiver 300. This causes the television receiver 300 to visually and audibly output the operational guide for software updating. Accordingly, the user can easily perform the operation for software updating according to the video and audio operational guide.

In the embodiment, an indication as to which of the microprocessors requires a software update is provided by the microprocessor 204 in the DVD reproduction apparatus 200 to the microprocessor 306 in the television receiver 300 using the control line CT. However, the embodiment is not limited to this, and the indication as to which of the microprocessors requires a software update may be provided to the microprocessor 306 using the InfoFrames included in the supplemental data that is transmitted by the DVD reproduction apparatus 200 to the television receiver 300.

In addition, the operational guide information comprising video data and audio data is transmitted from the DVD reproduction apparatus 200 to the television receiver 300. However, operational guide information comprising audio data or video data may be transmitted from the DVD reproduction apparatus 200 to the television receiver 300. In this case, the television receiver 300 outputs an audio operational guide or a video operational guide only.

Furthermore, in the embodiment, the DVD reproduction apparatus 200 outputs the pixel component B, pixel component G, and pixel component R to the data lines D1, D2, D3, respectively. However, the DVD reproduction apparatus 200 may output luminance data and two pieces of color-difference data to the data lines D1, D2, D3, respectively.

In the embodiment, the DVD reproduction apparatus 200 corresponds to a data reproduction apparatus, and the television receiver 300 corresponds to a video display apparatus and a television receiver. The transmission signal conversion IC 203 corresponds to a transmitter, the microprocessor 204 corresponds to a controller, and the memory 205 corresponds to a storage device. The reception signal conversion IC 301 corresponds to a receiver, the video processor 302 and the display 304 correspond to a video display unit, and the audio DAC circuit 303 and the speaker 305 correspond to an audio output unit. The microprocessor 306 corresponds to a processor, the memory 307 corresponds to a storage, the microprocessor 308 corresponds to another processor, and the memory 309 corresponds to another storage. The infoFrames corresponds to a third area.

The invention claimed is:

1. A data reproduction apparatus for reproducing data recorded in a recording medium, and capable of being connected via an interface bus to a video display apparatus that operates according to software, comprising:
    a transmitter that transmits video data and audio data read from the recording medium, using a first area and a second area, respectively, to said video display apparatus via said interface bus; and
    a controller that controls said transmitter to transmit, at the time of a software update for said video display apparatus, update software read from the recording medium to said video display apparatus via said interface bus, using a third area for transmission of additional data that is different from said first and second areas, while indicating the software update to said video display apparatus, wherein
    said interface bus includes a data line that transmits the video data, the audio data, and the additional data, a clock line that transmits a clock signal, and a control line that transmits a control signal,
    said first area is a video period of the video data, and said second and third areas are present in a blanking interval of the video data, and
    said transmitter outputs a clock signal to said clock line while transmitting, in synchronization with the clock signal, the update software via the data line using said third area.

2. The data reproduction apparatus according to claim 1, wherein
    information related to the software update is further recorded in the recording medium, and
    said controller controls, at the time of the software update for said video display apparatus, said transmitter to transmit the related information read from the recording medium to said video display apparatus via said interface bus, using said first area and/or said second area.

3. The data reproduction apparatus according to claim 2, wherein
    said related information includes audio data, and
    said controller controls said transmitter, at the time of the software update for said video display apparatus, to transmit the audio data in said related information read from the recording medium to said video display apparatus via said interface bus, using said second area.

4. The data reproduction apparatus according to claim 2, wherein
    said related information includes video data, and
    said controller controls said transmitter, at the time of the software update for said video display apparatus, to transmit the video data in said related information read from the recording medium to said video display apparatus via said interface bus, using said first area.

5. The data reproduction apparatus according to claim 2, wherein
    said related information includes operational guide information representing an operational procedure for the software update.

6. The data reproduction apparatus according to claim 1, wherein
    said update software includes identification information for identifying an object whose software should be updated, and
    said controller indicates a software update to said video display apparatus based on said identification information.

7. The data reproduction apparatus according to claim 6, further comprising a storage device that stores software for said controller, wherein
    said controller indicates a software update to said video display apparatus when said identification information represents said video display apparatus, and updates the software stored in said storage device, using the update software read from the recording medium, when said identification information represents a software update for said controller.

8. A video display apparatus capable of being connected to a data reproduction apparatus via an interface bus, wherein
    said interface bus includes a data line that transmits video data, audio data, and additional data using a first area, a second area and a third area, respectively, a clock line that transmits a clock signal, and a control line that transmits a control signal, and
    said first area is a video period of the video data, and said second and third areas are present in a blanking interval of the video data,
    said video display apparatus comprising:
    a receiver that receives the video data and the audio data transmitted by said data reproduction apparatus via said interface bus, using said first area and said second area, respectively, and receives update software transmitted in synchronization with the clock signal output to said clock line by said data reproduction apparatus, using said third area other than said first and second areas;
    an audio output unit that outputs a sound based on the audio data received by said receiver;
    a video display unit that displays an image based on the video data received by said receiver;
    a processor that controls said video display unit and said audio output unit; and
    a storage that stores software for said processor, wherein
    said processor updates, upon reception of the update software transmitted via said interface bus using said third area by said receiver, and indication of a software update by said data reproduction apparatus, the software stored in said storage using the update software received by said receiver.

9. The video display apparatus according to claim 8, wherein
    said processor controls said receiver to receive information related to the software update that is transmitted via said interface bus using said first area and/or said second area, and causes said video display unit to display an image and said audio output unit to output a sound, based on the related information received by said receiver.

10. The video display apparatus according to claim 8, further comprising:

an expansion function unit that implements an expansion function;

another processor that controls said expansion function unit; and another storage that stores software for said processor for said expansion function, wherein said processor transmits, upon indication of a software update for said other processor by said data reproduction apparatus, the update software received by said receiver to said other processor while indicating the software update for said other processor, and said other processor updates the software stored in said other storage according to the indication by said processor, using the update software transmitted from said processor.

11. A software updating system comprising:

a video display apparatus that operates according to software; and a data reproduction apparatus for reproducing data recorded in a recording medium, and capable of being connected to said video display apparatus via an interface bus, wherein said data reproduction apparatus includes:

a transmitter that transmits video data and audio data read from the recording medium, using a first area and a second area, respectively, to said video display apparatus via said interface bus; and a controller that controls said transmitter to transmit, at the time of a software update for said video display apparatus, update software read from the recording medium to said video display apparatus via said interface bus, using a third area for transmission of additional data other than said first and second areas, while indicating the software update to said video display apparatus, wherein said interface bus includes a data line that transmits the video data, the audio data, and the additional data, a clock line that transmits a clock signal, and a control line that transmits a control signal, said first area is a video period of the video data, and said second and third areas are present in a blanking interval of the video data, and said transmitter outputs a clock signal to said clock line while transmitting, in synchronization with the clock signal, the update software via the data line using said third area, wherein said video display apparatus comprises:

a receiver that receives the video data and audio data transmitted by said data reproduction apparatus via said interface bus using said first area and said second area, respectively;

an audio output unit that outputs a sound based on the audio data received by said receiver;

a video display unit that displays an image based on the video data received by said receiver;

a processor that controls said video display unit and said audio output unit; and a storage that stores software for said processor, wherein said processor updates, upon reception of the update software by said receiver that is transmitted via said interface bus using the third area for transmission of the additional data, and indication of the software update by said data reproduction apparatus, the software stored in said storage using the update software received by said receiver.

12. The software updating system according to claim 11, wherein said video display apparatus includes a television receiver.

13. A software updating method for updating software for a video display apparatus using a data reproduction apparatus for reproducing data recorded in a recording medium, and capable of being connected to said video display apparatus via an interface bus, comprising the steps of:

transmitting, at the time of a software update for said video display apparatus, update software read by said data reproduction apparatus from the recording medium to said video display apparatus via said interface bus, using a third area for transmission of additional data other than a first area for transmission of video data and a second area for transmission of audio data;

indicating the software update to said video display apparatus by said data reproduction apparatus;

receiving by said video display apparatus, upon indication of the software update by said data reproduction apparatus to said video display apparatus, the update software transmitted via said interface bus using said third area; and updating the software for said video display apparatus using said received update software, wherein said interface bus includes a data line that transmits the video data, the audio data, and the additional data, a clock line that transmits a clock signal, and a control line that transmits a control signal, said first area is a video period of the video data, and said second and third areas are present in a blanking interval of the video data, and transmitting the update software comprises outputting the clock signal to said clock line while transmitting, in synchronization with the clock signal, the update software via the data line using said third area.

* * * * *